(12) United States Patent  
Burton

(10) Patent No.: US 10,023,101 B2  
(45) Date of Patent: Jul. 17, 2018

(54) COMPLETE TRAVEL LENGTH CLUTCHING ADJUSTER

(71) Applicant: Burton Technologies, LLC, Ludington, MI (US)

(72) Inventor: John E. Burton, Ludington, MI (US)

(73) Assignee: Burton Technologies, LLC, Ludington, MI (US)

( * ) Notice: Subject to any disclaimer, the term of this patent is extended or adjusted under 35 U.S.C. 154(b) by 0 days.

(21) Appl. No.: 15/641,460

(22) Filed: Jul. 5, 2017

(65) Prior Publication Data

US 2018/0009368 A1    Jan. 11, 2018

Related U.S. Application Data

(60) Provisional application No. 62/366,467, filed on Jul. 25, 2016, provisional application No. 62/359,282, filed on Jul. 7, 2016.

(51) Int. Cl.
  *B60Q 1/068* (2006.01)
  *F16H 25/20* (2006.01)

(52) U.S. Cl.
  CPC ........ *B60Q 1/0683* (2013.01); *F16H 25/2021* (2013.01)

(58) Field of Classification Search
  CPC .................................................. B60Q 1/10683
  See application file for complete search history.

(56) References Cited

U.S. PATENT DOCUMENTS

| 5,453,914 | A  | 9/1995  | Dobler |
| 5,707,133 | A  | 1/1998  | Burton |
| 5,779,343 | A  | 7/1998  | Denley |
| 6,017,136 | A  | 1/2000  | Burton |
| 6,773,153 | B2 | 8/2004  | Burton |
| 6,974,231 | B2 | 12/2005 | Burton |
| 7,066,632 | B2 | 6/2006  | Burton |
| 7,762,686 | B2 | 7/2010  | Fladhammer |
| 2014/0153268 | A1 | 6/2014 | Burton |

FOREIGN PATENT DOCUMENTS

| EP | 1946966     | 7/1998 |
| WO | WO2005042304 | 5/2005 |

OTHER PUBLICATIONS

Extended European search report dated Oct. 27, 2017 for Application No. 17180142.6-1762.

*Primary Examiner* — Joseph L Williams

(74) *Attorney, Agent, or Firm* — James A. Joyce; Godfrey & Kahn, S.C.

(57) ABSTRACT

A clutching adjuster having a housing with a nose, the nose including a plurality of discrete helically-shaped thread segments, a ball stud journaled by a ball stud bore for axial movement therethrough and passing through the nose of the housing, the ball stud having a threaded portion, an unthreaded portion, a ball, and a drive spline portion, an outbound annular travel barrier and an inbound annular travel barrier, wherein, in length of travel clutching operation and end of travel clutching operation where the ball stud is axially rotated through the ball stud bore, the receipt of an undue axial force of resistance on the ball stud results in outward deflection of engaged thread segments, thereby allowing the threaded engagement between the threaded portion of the ball stud and the thread segments to clutch.

19 Claims, 21 Drawing Sheets

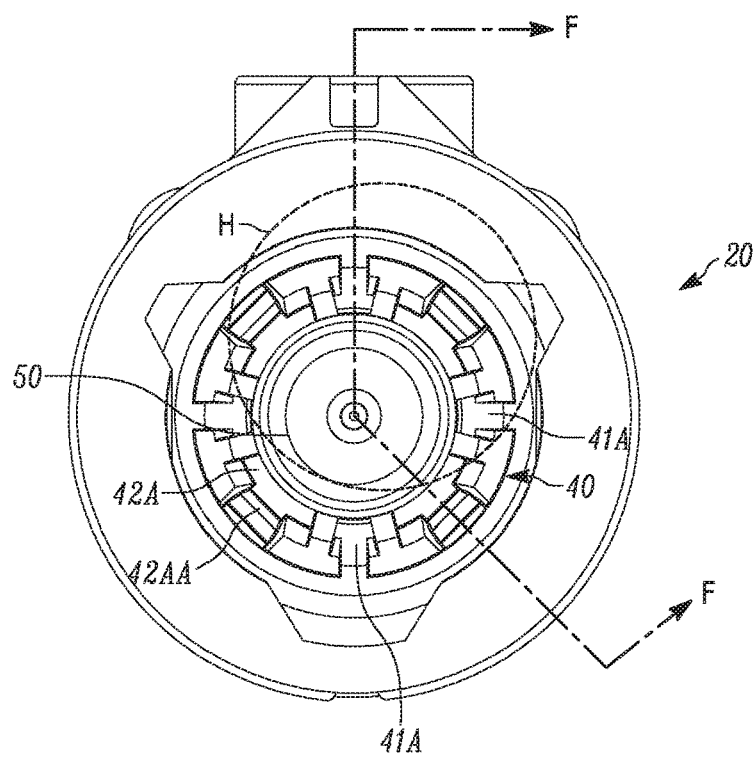
FIG. 2AA
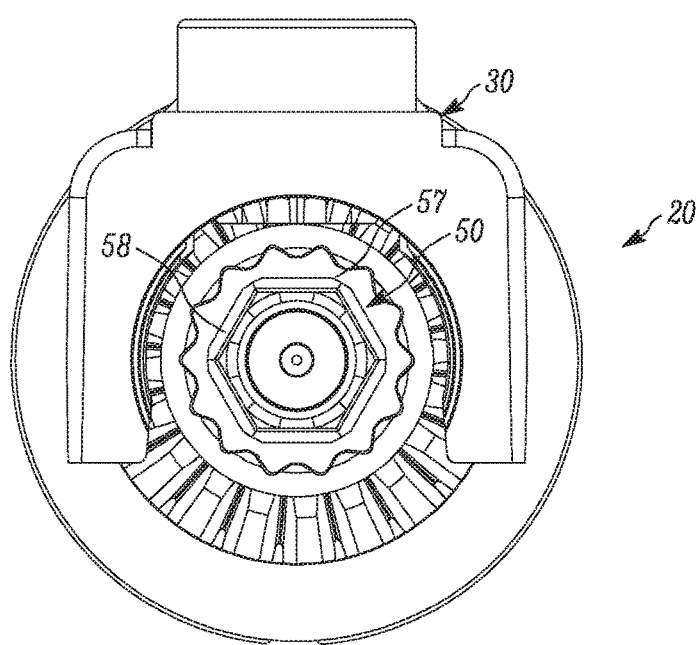
FIG. 2AAA

COMPLETE TRAVEL LENGTH CLUTCHING ADJUSTER

CROSS-REFERENCE TO RELATED APPLICATION

This application claims priority to U.S. Provisional Patent Appl. No. 62/359,282 filed on Jul. 7, 2016 and U.S. Provisional Patent Appl. No. 62/366,467 filed on Jul. 25, 2016, the disclosures of which are incorporated herein by reference in their entirety for all purposes.

FIELD OF THE INVENTION

The adjuster relates generally to the field of adjusters that are used to adjust the aim of a vehicle lamp. More particularly, the adjuster relates to a vehicle lamp adjuster that can be actuated such that it clutches along its length of travel if subjected to undue axial force and clutches at the end of its intended travel length regardless of the resistance.

BACKGROUND

Vehicles such as automobiles typically have several lamps including head lamps and fog lamps. These lamps generally include a housing supporting a reflector (which is typically mounted within the housing on a mounting bracket) and a lens with a bulb mounted therebetween, the entire lamp assembly being attached to the vehicle. Examples of such a configuration are shown in U.S. Pat. Nos. 5,707,133 and 6,974,231 to Burton. Once the lamp assembly has been manufactured and installed into a vehicle, the lamp must be adjusted to the proper aim. Typically the adjustment is in both the vertical and horizontal directions but, depending on the type of lamp and applicable regulations, adjustment in only one direction may be required. As a result of accidents, maintenance, and normal vibrations and wear, the aim of the lamp may need to be occasionally adjusted during the lifetime of the vehicle as well.

One method of adjusting the aim of the lamp involves using an adjuster. The adjuster may be formed as part of the mounting bracket, part of the housing, or may be a separate part between the housing and the mounting bracket (or the reflector directly if no separate mounting bracket is used). One known type of adjuster includes a housing and an output shaft extending therefrom. The output shaft is engaged to the reflector directly or to a mounting bracket on which the reflector is positioned. Actuation or operation of the adjuster causes the output shaft to move. Such movement causes the mounting bracket and/or reflector to pivot or otherwise move with respect to the housing, thereby adjusting the aim of the lamp. One example of this type of adjuster is disclosed in U.S. Pat. No. 6,773,153 to Burton, the disclosure of which is incorporated herein by reference for all purposes. The housing of the adjuster in this Burton design has an opening and a gear positioned inside the housing. The gear is functionally engaged to a ball stud output shaft. An input shaft is positioned in the opening and interacts with the gear. Actuation of the input shaft results in rotation of the gear and engaged output shaft. The gear translates actuation of the input shaft into axial movement of the output shaft and its ball stud end. Numerous variations exist on this general concept.

Providing end of travel clutching regardless of resistance present is desirable to prevent adjuster disengagement or damage to the headlamp components, the reflector and mounting bracket in particular. One method for accomplishing end of travel clutching is disclosed in U.S. Pat. No. 6,773,153 to Burton. It is also desirable to have clutching along the length of travel if an undue axial force is present. Standardization of adjusters is desired in the industry which means using one length of travel for many different lamp designs. This creates the possibility of having the adjuster length of travel exceed that of the reflectors' range of motion in a particular lamp design. When the length of travel of the adjuster exceeds the reflectors' range of motion it may collide with other lamp components such as the lamp housing, bezel, or lens. If adjustment continues after a collision between lamp components occurs, a resistance force builds. Damage or fracture of lamp components may result with undue resistance. Having an adjuster that clutches prior to undue resistance could prevent this from occurring. Examples of adjusters with length of travel clutching are described in U.S. Pat. No. 7,762,686 to Fladhammer and U.S. Pat. No. 6,017,136 to Burton.

Thus, it is desirable to have an adjuster that combines effective length of travel clutching when an undue resistance is present with end of travel clutching regardless of resistance present. It is also desirable to minimize clutching force variation along the length of travel because damage can occur to lamp, ball socket, or adjuster components if the clutching force varies too high. And if the clutching force varies too low, this could prevent achieving the desired aim (positioning).

Accordingly, a need exists for an improved lamp adjuster that solves these and other deficiencies in the prior art. Of course, the complete travel length clutching adjuster may be used in a multitude of situations where similar performance capabilities are required. It will be understood by those skilled in the art that one or more aspects of the complete travel length clutching adjuster can meet certain objectives, while one or more other aspects can lead to certain other objectives. Other objects, features, benefits and advantages of the complete travel length clutching adjuster will be apparent in this summary and descriptions of the disclosed embodiment, and will be readily apparent to those skilled in the art. Such objects, features, benefits and advantages will be apparent from the above as taken in conjunction with the accompanying figures and all reasonable inferences to be drawn therefrom.

SUMMARY OF THE INVENTION

In at least some embodiments, an adjuster is provided that is cost-effective, provides improved functionality, and which solves certain of the problems raised or not solved by existing designs. The new adjuster provides clutching throughout the length of travel of a ball stud as well as an end of travel clutching feature. The adjuster includes a housing with at least one helical thread segment molded into the nose of the housing. The nose is divided by thread slots into multiple nose segments that have helical thread segments at their ends. A threaded portion of the ball stud is engaged to the helical thread segments. Rotation of an input gear (or direct engagement of the drive gear with a driver) causes rotation of the drive gear. Drive gear splines on the interior of the drive gear are rotationally engaged to drive splines or portions thereof (drive spline portion) on the ball stud. Thus, when the drive gear rotates, the ball stud also rotates. As the ball stud rotates, the threaded portion engages the helical thread segment which causes the ball stud to move axially in normal operation. If the ball stud meets a significant force resistance, the helical thread segments will expand outward over a ball stud thread outer portion to clutch and prevent damage, wherein in at least some embodiments, "clutch" and "clutching" are understood to indicate a slippage in a threaded engagement such that axial movement is substantially or completely prevented. End of travel clutching is provided using annular travel barriers on the ball stud (an outbound annular travel barrier wall and an inbound annular travel barrier wall) that eliminate the need for a clutching feature on the drive gear as is used in the design disclosed in U.S. Pat. No. 6,773,153 to Burton. When the threaded portion of the ball stud is rotated so that the engagement point with the helical thread segment reaches the outbound annular travel barrier wall or the inbound annular travel barrier wall and the ball stud continues to rotate, the helical thread segments expand and attempt to jump over the barrier. However, one of the helical thread segments does not jump and provides a retaining force that prevents disengagement of the threaded portion of the ball stud. The helical thread segments then snap back into a ball stud thread inner portion after one full rotation.

In at least some embodiments, the complete travel length clutching adjuster for use with a headlamp includes: a housing having a ball stud bore; a nose on an end of the housing, the nose including a plurality of discrete helically-shaped thread segments, wherein the thread segments of the nose are biased towards the ball stud bore; a ball stud journaled by the ball stud bore for axial movement therethrough and passing through the nose of the housing, the ball stud having a threaded portion, an unthreaded portion, a ball extending from a first end thereof, and a drive spline portion proximate a second end thereof; an outbound annular travel barrier positioned on the ball stud between the threaded portion and the unthreaded portion of the ball stud, and an inbound annular travel barrier positioned on the ball stud between the threaded portion and the first end; wherein, in adjusting operation, rotation of the ball stud via the drive spline causes axial movement of the ball stud through the ball stud bore via threaded engagement of the threaded portion of the ball stud and thread segments of the nose; wherein, in length of travel clutching operation where the ball stud is axially rotated through the ball stud bore and neither the outbound annular travel barrier or the inbound annular travel barrier is in abutment with the thread segments of the nose, the receipt of an undue axial force of resistance on the ball stud results in outward deflection of engaged thread segments, thereby allowing the threaded engagement between the threaded portion of the ball stud and the thread segments of the nose to clutch; and wherein, in end of travel clutching operation where the ball stud is axially rotated and either the outbound annular travel barrier or inbound annular travel barrier is in abutment with the thread segments, a resultant outward deflection of the engaged thread segments of the nose is provided, thereby allowing the threaded engagement between the threaded portion of the ball stud and the thread segments of the nose to clutch.

While one possible application of the complete travel length clutching adjuster is in connection with a vehicle lamp, other applications are possible and references to use in connection with a vehicle lamp should not be deemed to limit the uses of the complete travel length clutching adjuster. The terms used herein should not be interpreted as being limited to specific forms, shapes, or compositions. Rather, the parts may have a wide variety of shapes and forms and may be composed of a wide variety of materials. These and other objects and advantages of the complete travel length clutching adjuster will become apparent from the detailed description, claims, and accompanying drawings.

BRIEF DESCRIPTION OF THE DRAWINGS

Embodiments of the adjuster are disclosed with reference to the accompanying drawings and are for illustrative purposes only. The adjuster is not limited in its application to the details of construction or the arrangement of the components illustrated in the drawings. The adjuster is capable of other embodiments or of being practiced or carried out in other various ways. In the drawings:

FIG. 2AA is a front view of the adjuster of FIG. 1A;

FIG. 2AAA is a rear view of the adjuster of FIG. 1A;

FIG. 8AA is a detail view of a portion of the adjuster taken at H in FIG. 2AA;

DETAILED DESCRIPTION

The Figures show exemplary embodiments of adjusters 20 that provide clutching throughout the length of travel of a ball stud 50 (i.e., length of travel clutching operation) as well as an end of travel clutching feature (i.e., end of travel clutching operation). Three embodiments are shown and grouped as—FIGS. 1-15, FIGS. 1A-15A, and FIGS. 16-22—and additional alternative embodiments are contemplated without departing from the spirit of the complete travel length clutching adjuster. Like part numbers are used in all embodiments where possible to indicate like parts, which include the same or similar structure and/or perform the same or similar functions.

Figure 13:
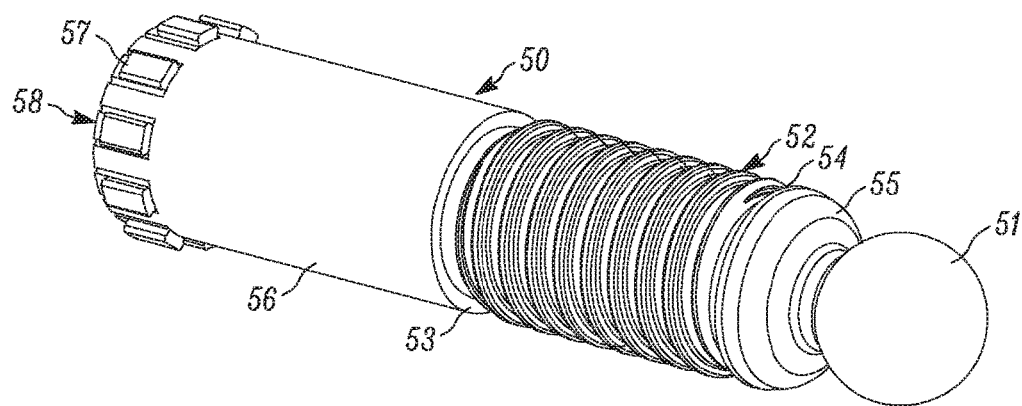
FIG. 13 is a perspective view of the ball stud of the adjuster of FIG. 1.
Figure 13A:
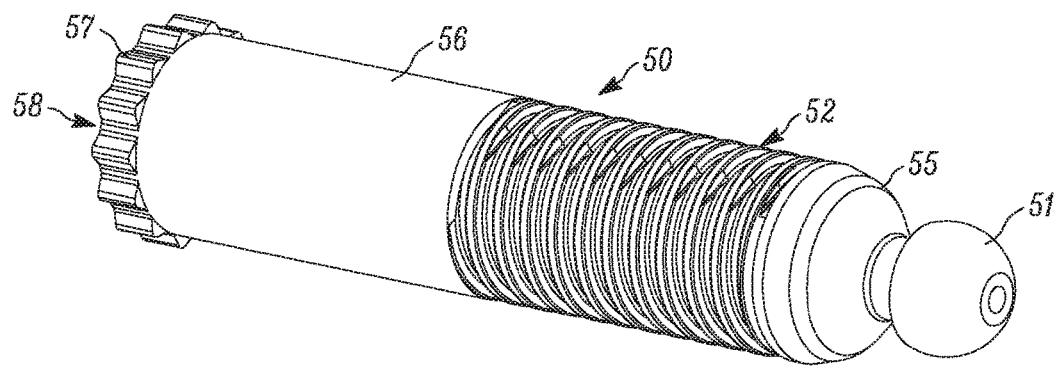
FIG. 13A is a perspective view of the ball stud of the adjuster of FIG. 1A.
Figure 14:
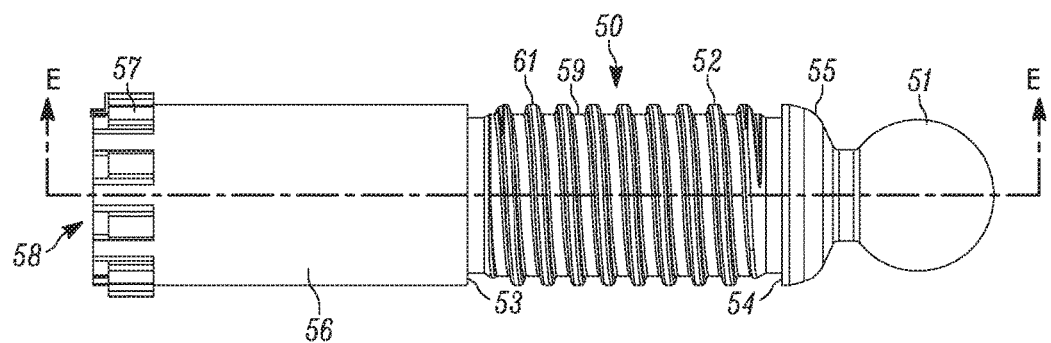
FIG. 14 is a side view of the ball stud of FIG. 13.
Figure 14A:
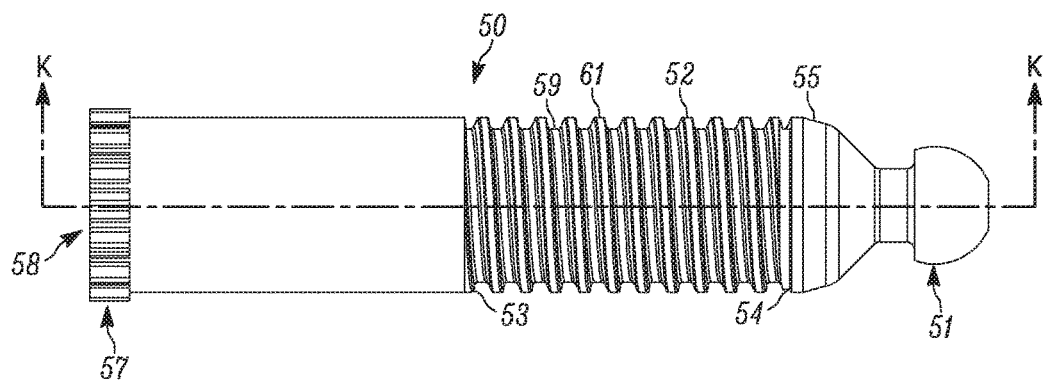
FIG. 14A is a side view of the ball stud of FIG. 13A.
Figure 15:
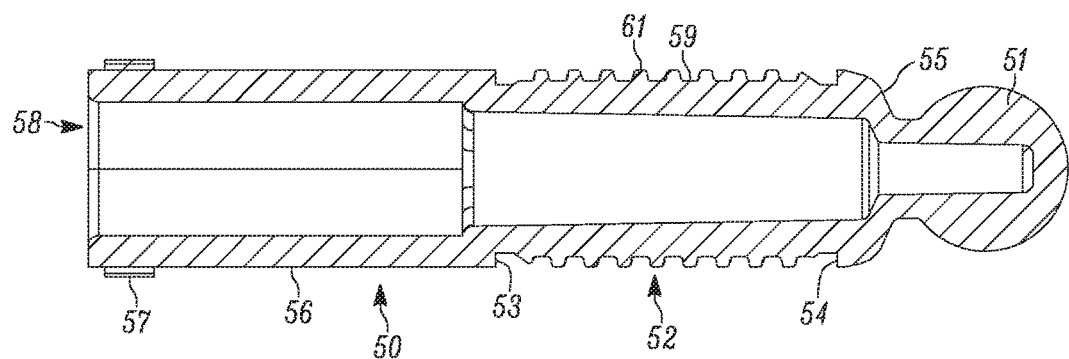
FIG. 15 is a side cross-sectional view of the ball stud of FIG. 13, taken generally along the line E-E in FIG. 14.
Figure 15A:
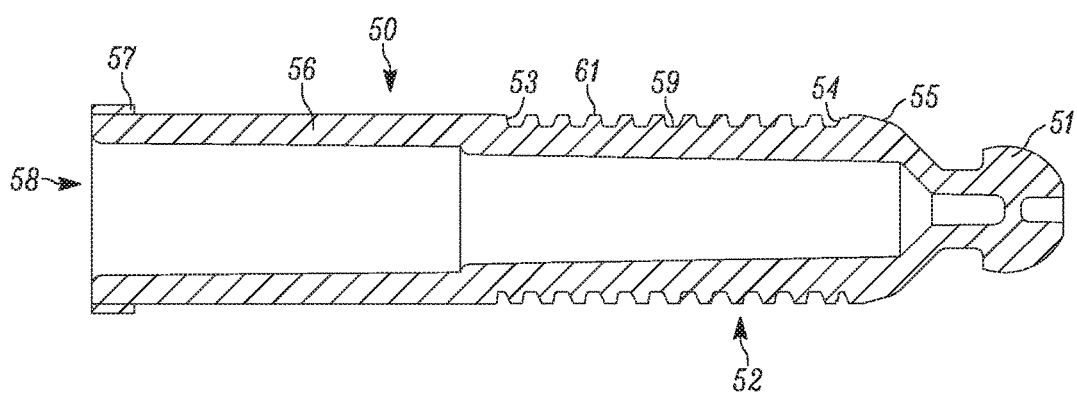
FIG. 15A is a side cross-sectional view of the ball stud of FIG. 13A, taken generally along the line K-K in FIG. 14A.
Figure 16:
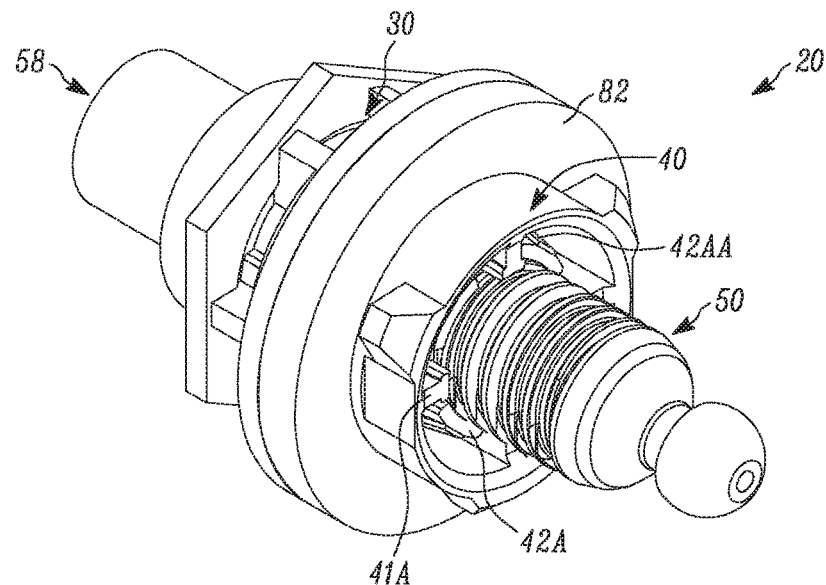
FIG. 16 is a front perspective view of an additional exemplary embodiment of an adjuster having complete travel length clutching.
Figure 17:
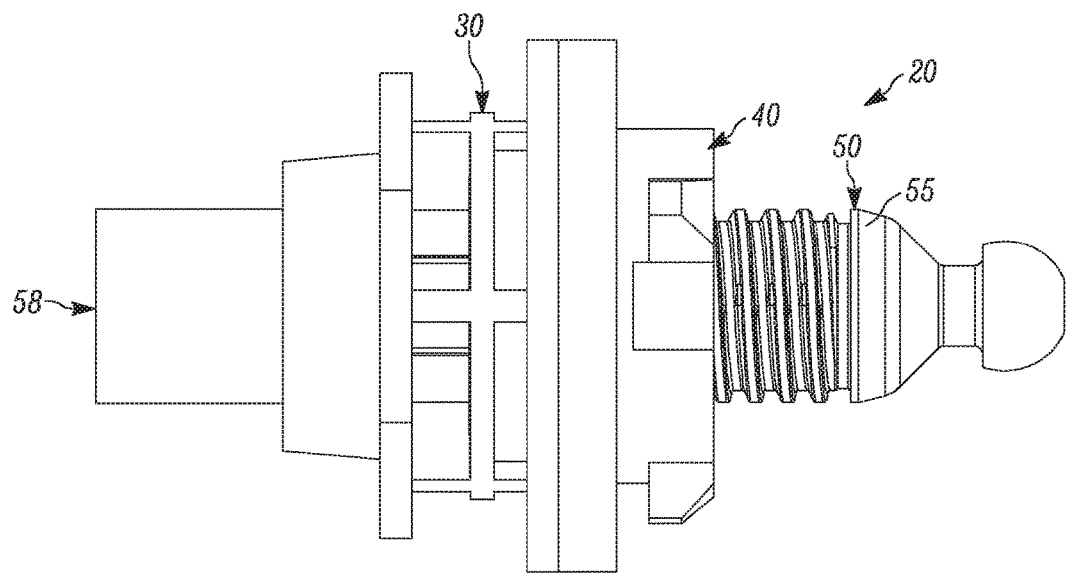
FIG. 17 is a side view of the adjuster of FIG. 16.
Figure 18:
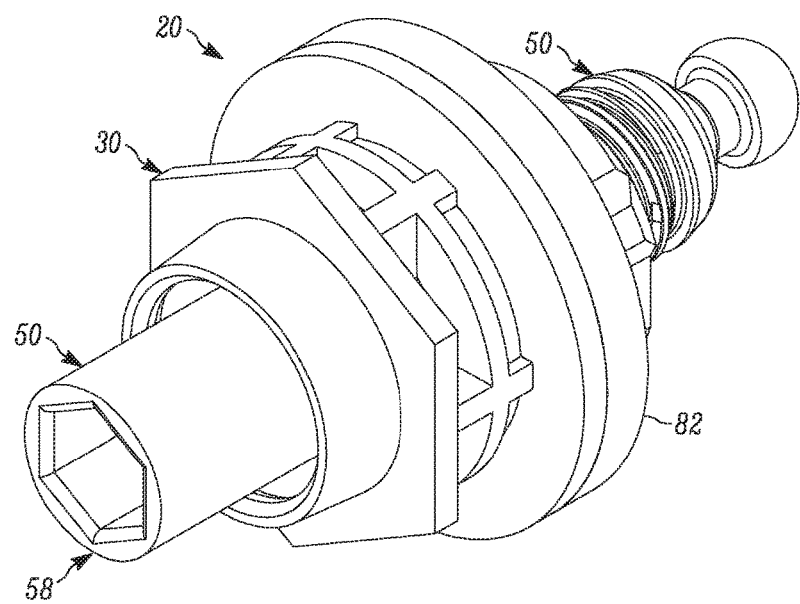
FIG. 18 is a rear perspective view of the adjuster of FIG. 16.
Figure 19:
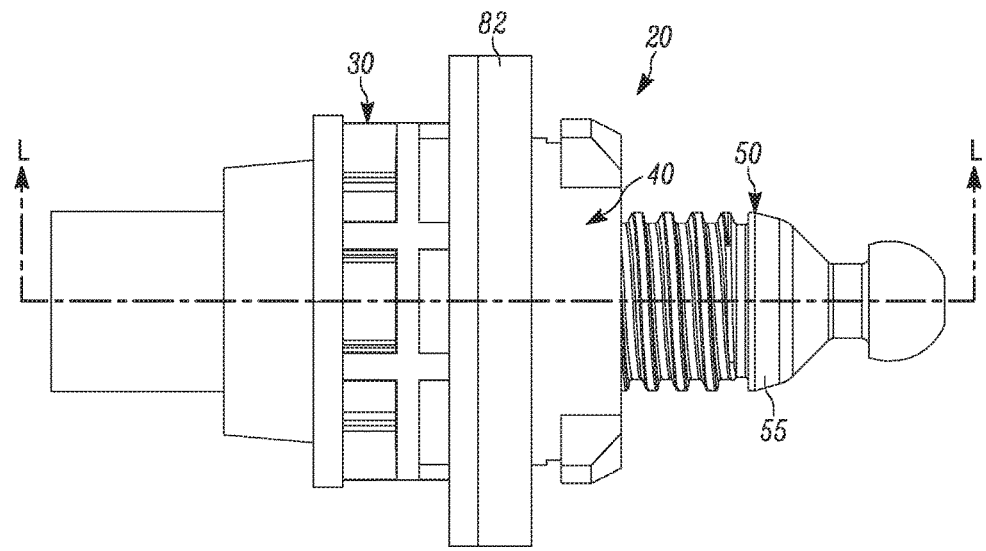
FIG. 19 is a top view of the adjuster of FIG. 16.
Figure 20:
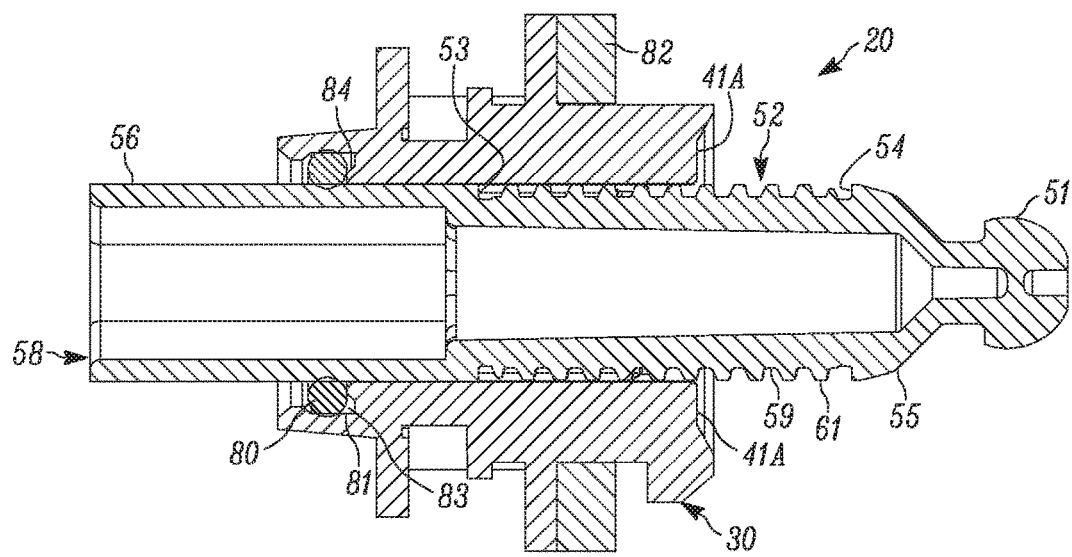
FIG. 20 is a cross-section of the adjuster of FIG. 16, taken generally along the line L-L in FIG. 19.
Figure 21:
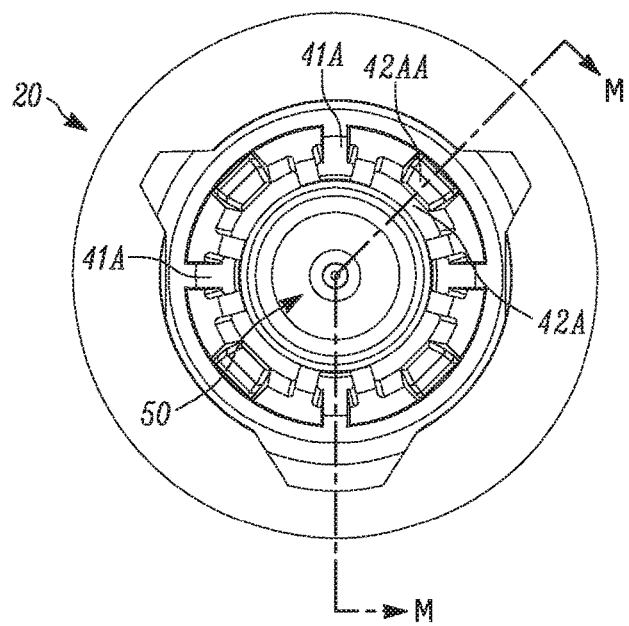
FIG. 21 is a front view of the adjuster of FIG. 16.
Figure 22:
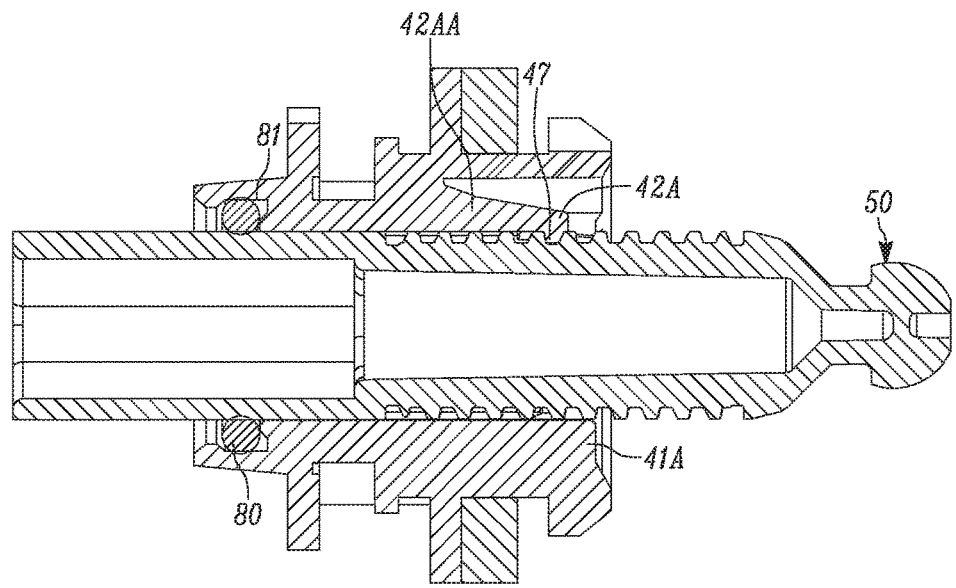
FIG. 22 is a cross-section of the adjuster of FIG. 16, taken generally along the line M-M in FIG. 21.

In a first exemplary embodiment, as seen in FIGS. 13-15, ball stud 50 has a ball 51 suitable for engagement with a portion of a lamp assembly 36, such as a reflector 38 (or an extension thereof) within a lamp housing 37, a threaded portion 52, an unthreaded portion 56, and a drive spline 57. The threaded portion 52 has a lead end 55 adjacent the ball 51 with an inbound annular travel barrier wall 54 at the end thereof. The other end of the threaded portion 52 of the ball stud 50 terminates with an outbound annular travel barrier wall 53. In addition, the threaded portion 52 includes a plurality of ball stud thread outer portions 61 extending outward from the ball stud 50, and ball stud thread inner portions 59 situated generally therebetween.

Figure 10:
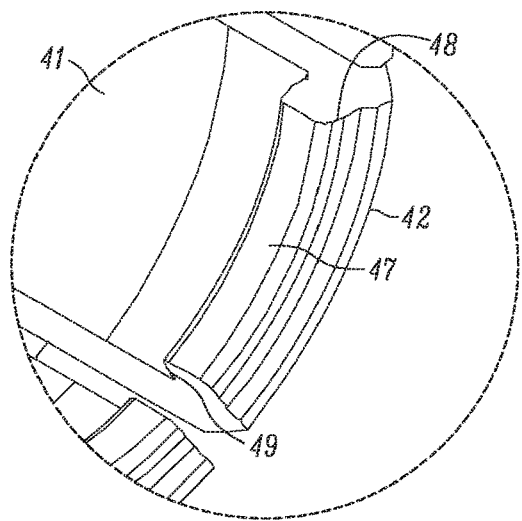
FIG. 10 is a detail view of a portion of the housing taken at C in FIG. 9.
Figure 10A:
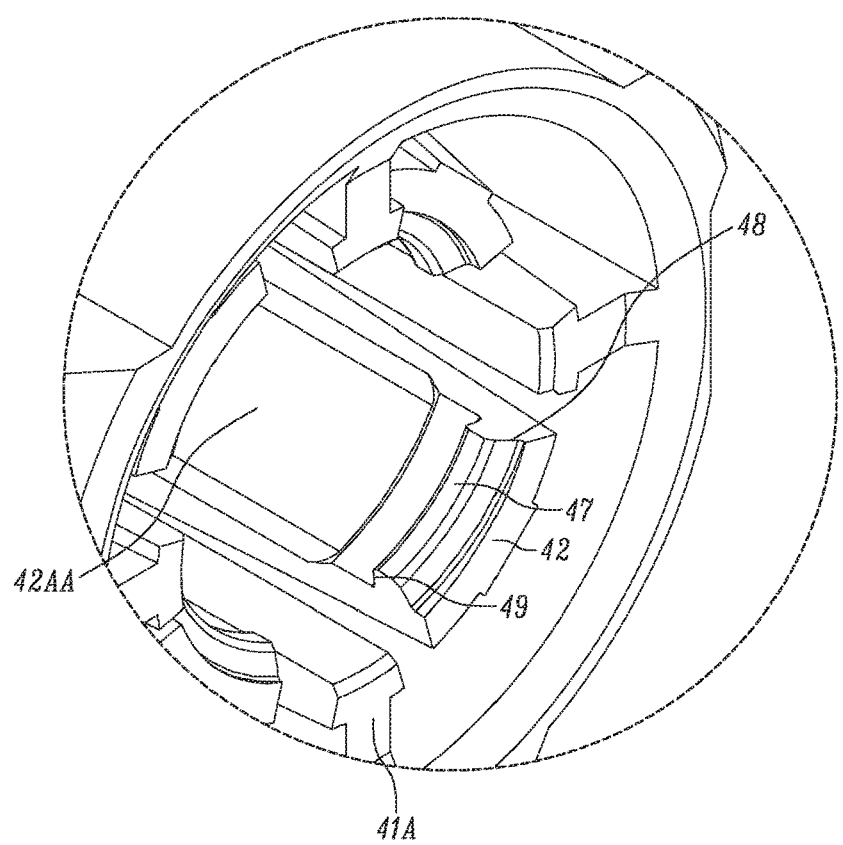
FIG. 10A is a detail view of a portion of the housing taken at I in FIG. 9A.
Figure 11:
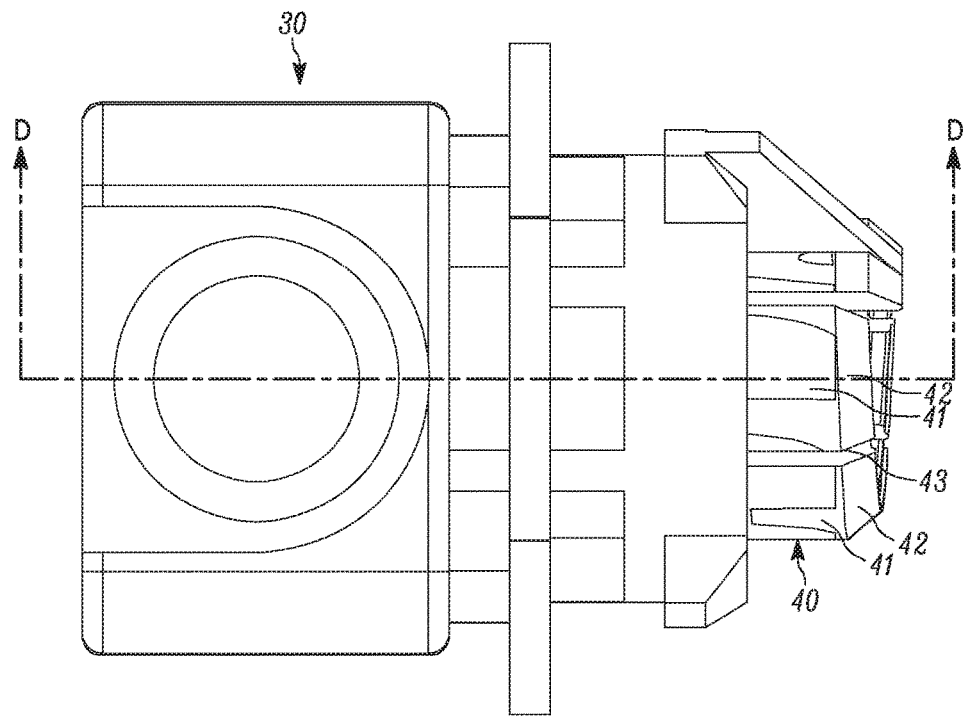
FIG. 11 is a top view of the housing of FIG. 9.
Figure 11A:
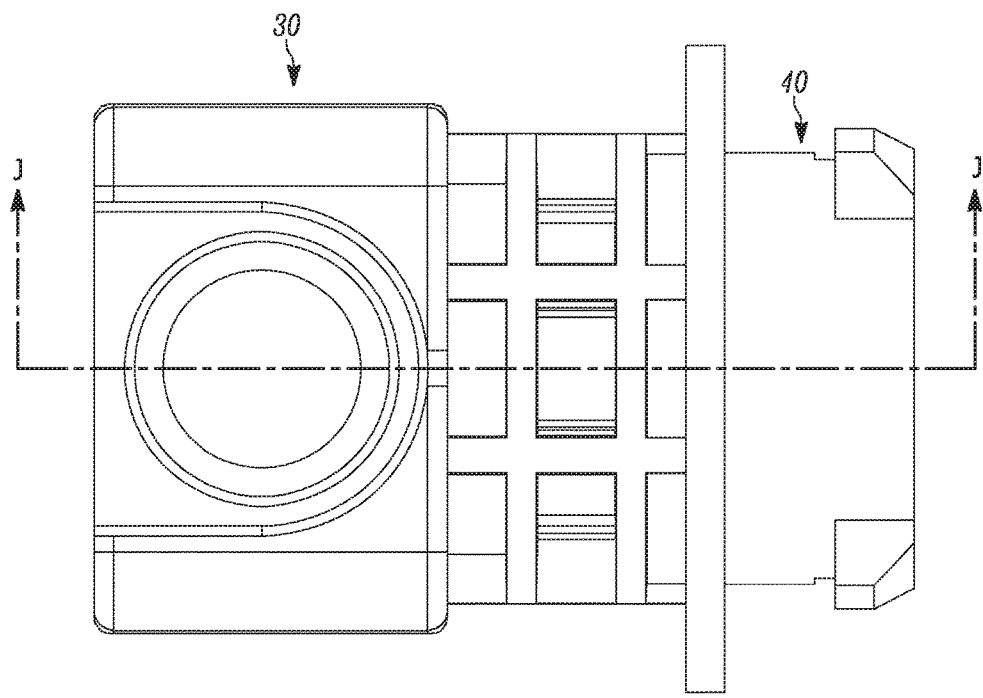
FIG. 11A is a top view of the housing of FIG. 9A.

As best seen in FIGS. 1-7 and 9-12, the adjuster 20 includes a housing 30 with at least one helical thread segment 42 molded into a nose 40 of the housing 30. In at least some embodiments, the nose 40 of the housing 30 is divided by thread slots 43 into multiple nose segments 41 that have the helical thread segments 42 at their ends. The helical thread segments 42 further include a thread tooth 47 that extends inward towards the ball stud bore 34 for engagement with the threaded portion 52 of the ball stud 50. Each thread tooth 47 further includes a thread tooth leading edge 48 and a thread tooth trailing edge 49 (FIG. 10).

The housing 30 is shown as a single molded plastic part but could be formed from multiple pieces assembled together. The housing 30 includes a drive gear bore 33 for journaling a drive gear 70 and a ball stud bore 34 for journaling a ball stud 50 such that it extends from the nose 40 of the housing 30. As shown, the housing 30 forms an input gear bore 32 for journaling an input gear 60 that can be driven via an drive slot 62 using an engagement tool, such as a Phillips head screwdriver, hex driver, etc. Alternatively, an opening can be provided through which an engagement tool, such as a Phillips head screwdriver can directly engage and drive the drive gear 70.

Figure 7:
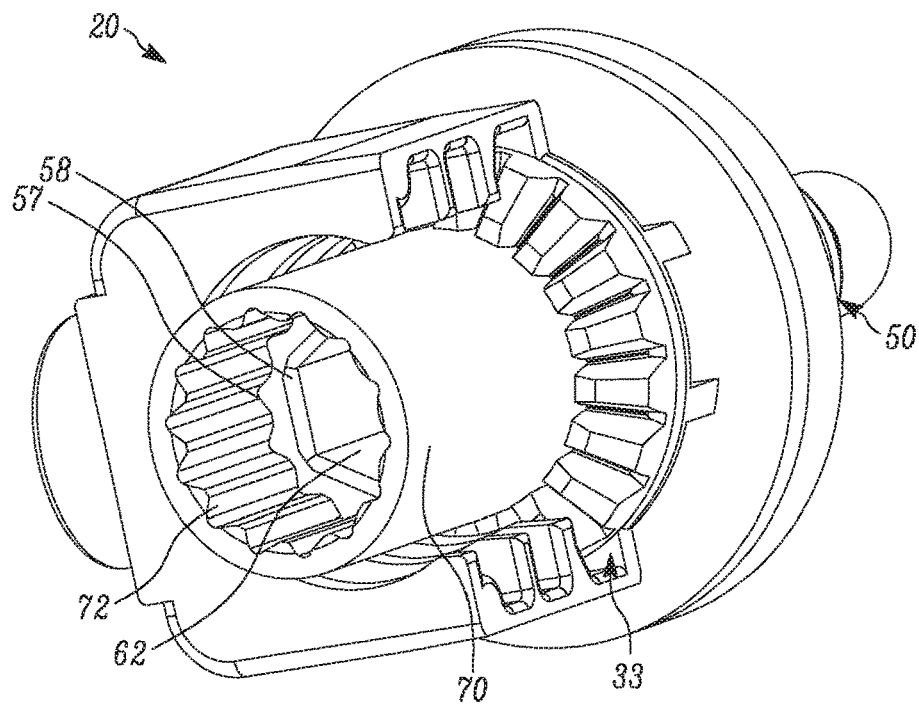
FIG. 7 is a bottom rear perspective view of the adjuster of FIG. 1.
Figure 7A:
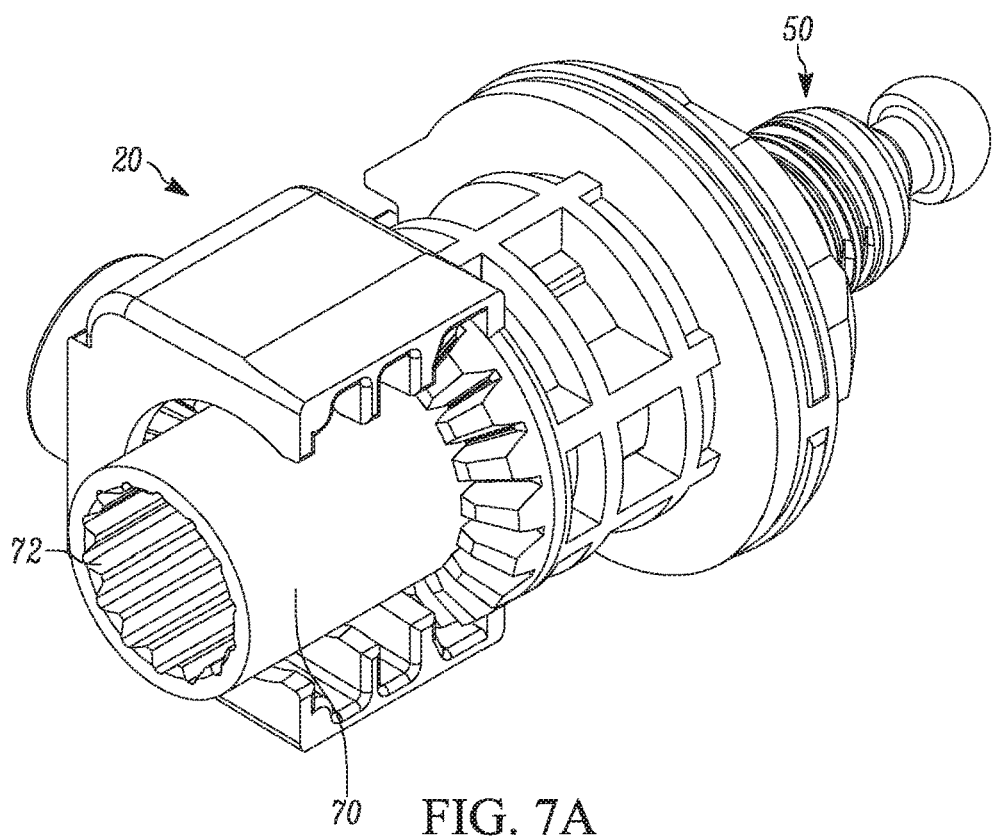
FIG. 7A is a bottom rear perspective view of the adjuster of FIG. 1A.

Rotation of the input gear 60 (or direct engagement of the drive gear 70 with an engagement tool) causes rotation of the drive gear 70 via engagement of the input gear 60 with a plurality of beveled teeth 71 encircling the drive gear 70. Drive gear 70 includes a plurality of internal drive gear splines 72 that are rotationally engaged to drive splines 57 (also referred to as drive spline portions) on the ball stud 50. Thus, when the drive gear 70 is caused to rotate, ball stud 50 is also caused to rotate. As the ball stud 50 rotates, a threaded portion 52 of the ball stud 50 engages the helical thread segment 42 on the nose 40 of the housing. This threaded engagement causes the ball stud 50 to move axially with respect to the ball stud bore 34 during normal operation. Alternatively, as best seen in FIG. 7, the ball stud 50 can be directly rotated by an engagement tool, such as a hex driver, inserted into an appropriately shaped ball stud rear end 58 of the ball stud 50. This multi-point actuation is possible because the clutching occurs at the interface between the ball stud 50 and the nose 40 of the housing 30.

Figure 8:
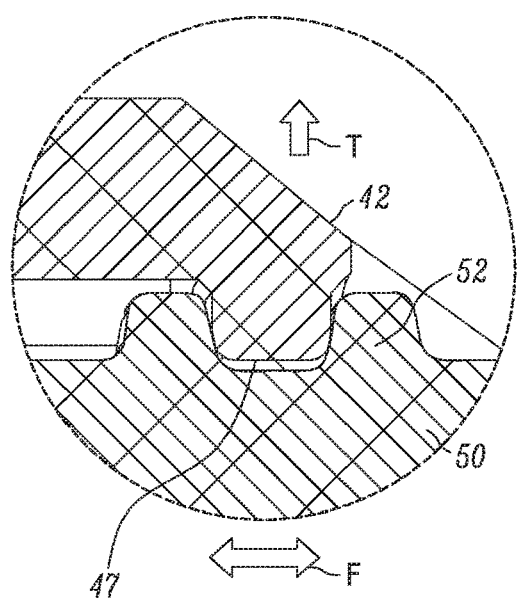
FIG. 8 is a detail view of a portion of the adjuster taken at B in FIG. 4.
Figure 8A:
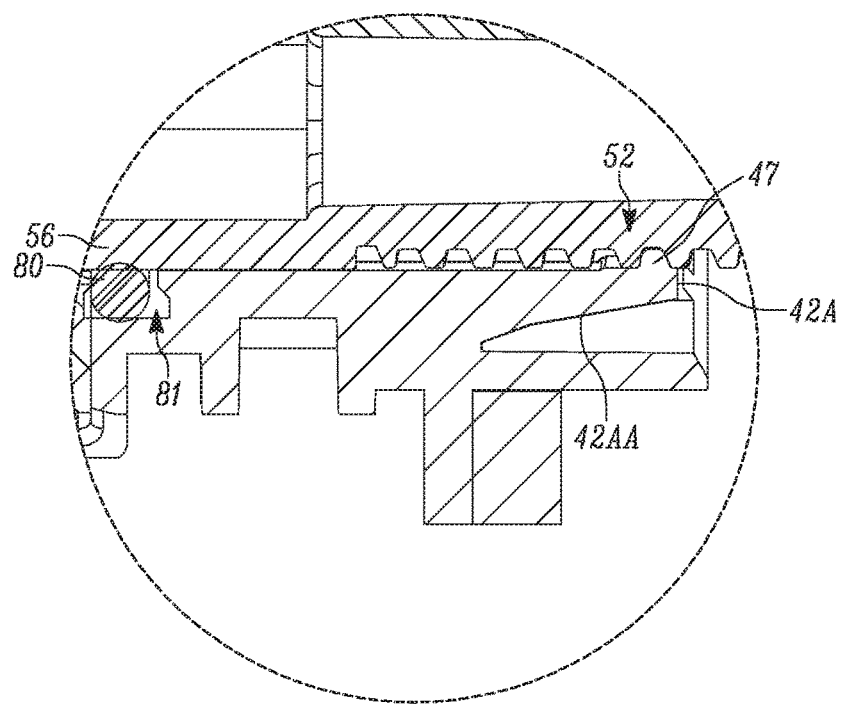
FIG. 8A is a detail view of a portion of the adjuster taken at G in FIG. 4A.
Figure 8A:
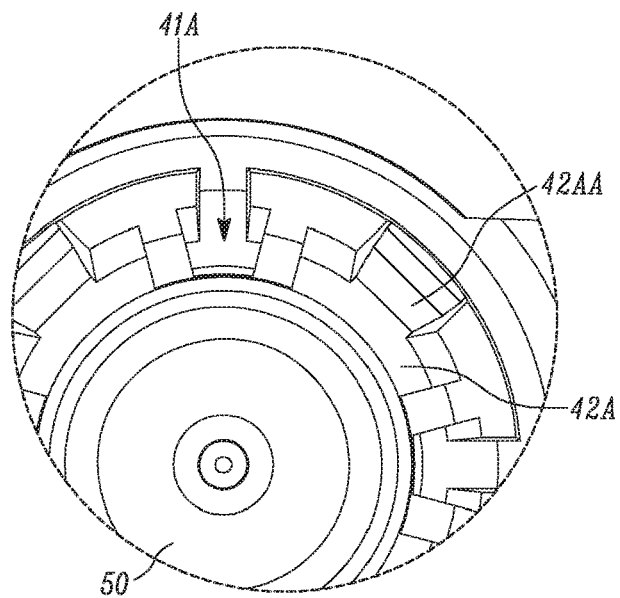
Figure 9:
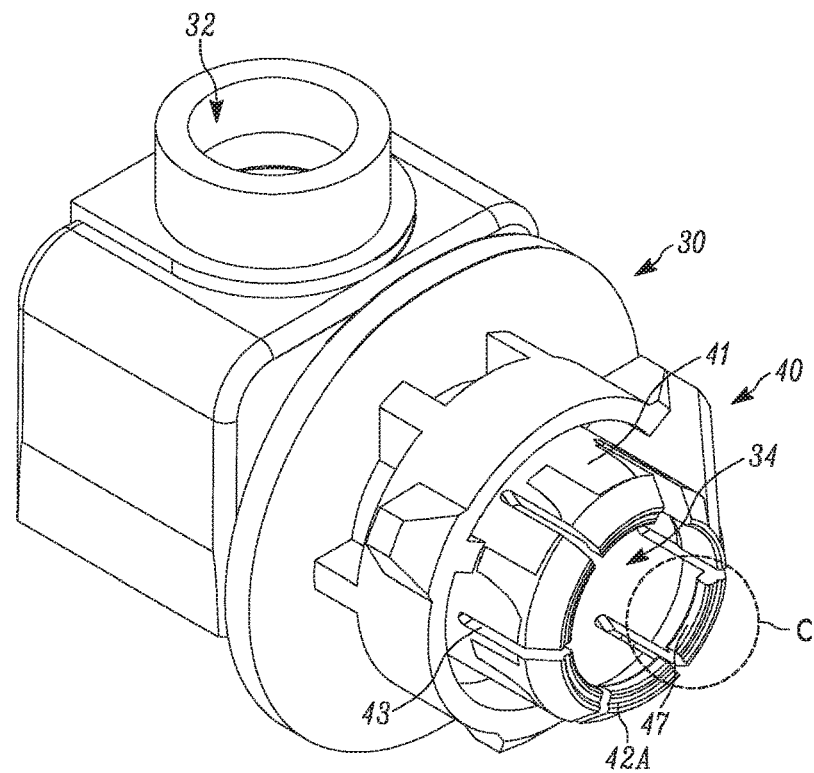
FIG. 9 is a front perspective view of the housing of the adjuster of FIG. 1.
Figure 9A:
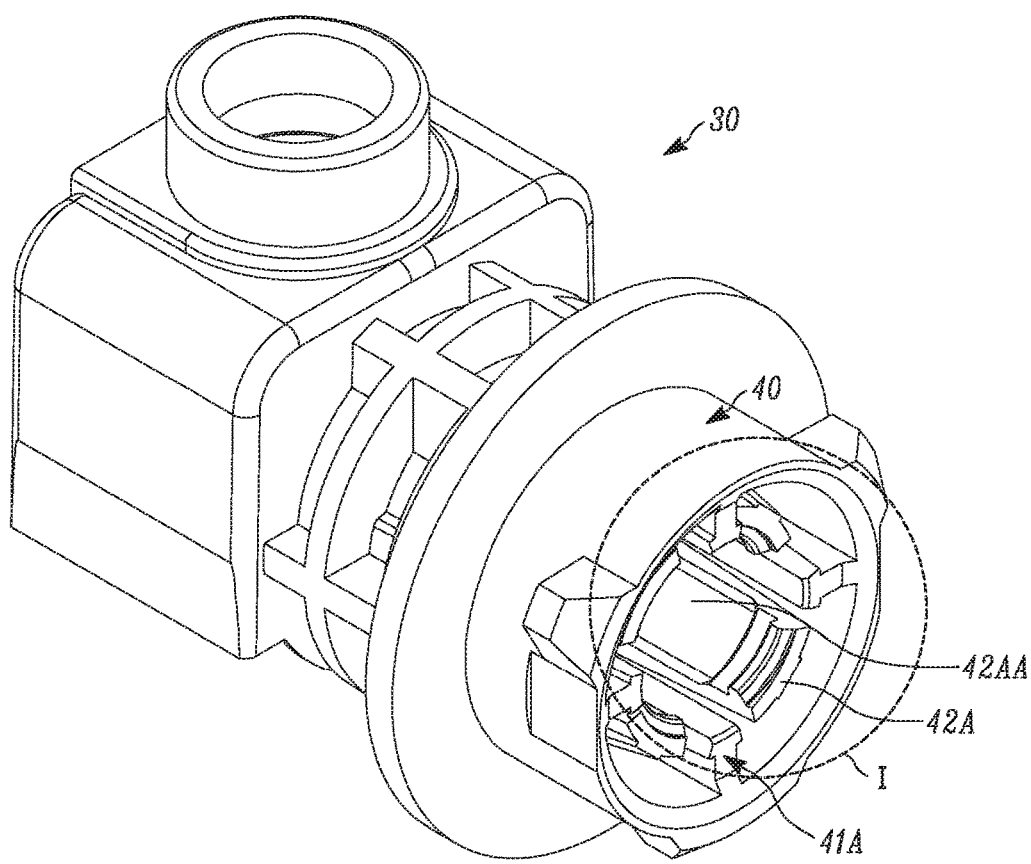
FIG. 9A is a front perspective view of the housing of the adjuster of FIG. 1A.
Figure 12:
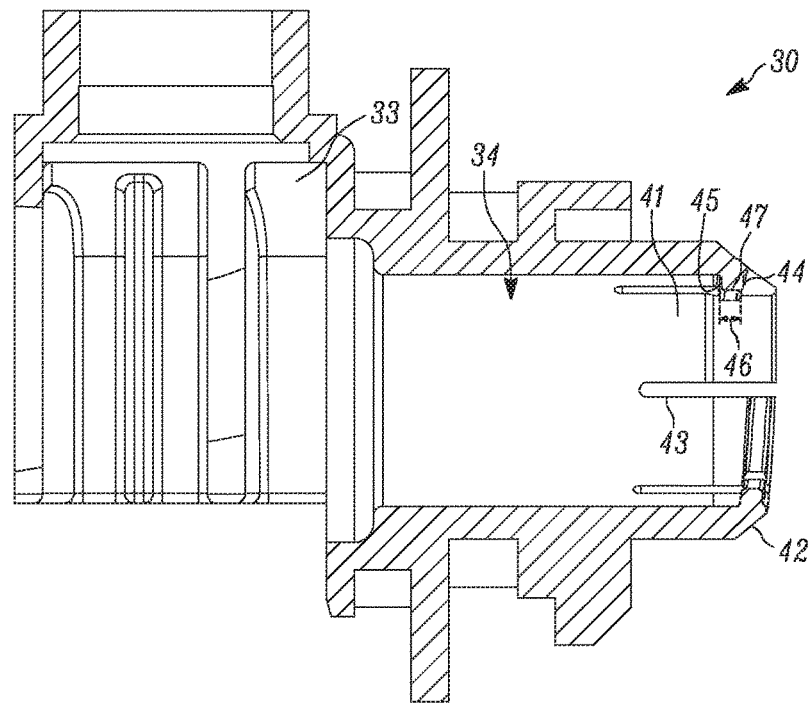
FIG. 12 is a side cross-sectional view of the housing of FIG. 9, taken generally along the line D-D in FIG. 11.

Referring now to FIGS. 8, 12, and 15, during axial adjustment of the ball stud 50 in the housing 30, tension is created between the helical thread segment(s) 42 that are engaged with the threaded portion 52 of the ball stud 50. If the ball stud 50 meets a significant (undue) axial force of resistance "F", the helical thread segment(s) 42 on the nose segments 41 in the nose 40 of the housing 30 will flex outward in direction "T" to lift out of the ball stud thread inner portion 59 and over the adjacent ball stud thread outer portion 61, and back into the ball stud thread inner portion 59, this prevents damage to components interconnected with the adjuster, such as portions of the lamp assembly (e.g., reflector, lamp, etc.), or to the adjuster components themselves. The depth and thickness of the threads (ball stud thread outer portions 61) and configuration of the thread faces in the threaded portion 52 of the ball stud 50 (and the corresponding helical thread segments 42), number of nose segments 41, length of thread slots 43, and mating thread geometries can be proportioned to clutch at a desired force resistance (undue force resistance level) for both inbound and outbound travel directions of the ball stud 50. Since the helical thread segment(s) 42 directly resist any axially inward or outward ball force, greater clutching force consistency can be achieved. More particularly, in at least some embodiments, the axial force of resistance "F", is a force received (experienced) by the ball stud in either axial direction. Further, in at least some embodiments, the axial force of resistance "F" is considered undue when greater than 100 Newtons, where in other embodiments, the axial force of resistance "F" is considered undue when greater than 500 Newtons, where in yet other embodiments, the axial force of resistance "F" is considered undue when greater than or less than 100 Newtons. The axial force of resistance "F" is generally a result of resistance provided by a collision of a reflector or other member attached to the ball 51 with another object.

As with all embodiments disclosed herein, the clutching mechanism is actionable along the entire (complete) length of the threaded portion 52 of the ball stud 50 as it is rotated through the nose 40 between the outbound annular travel barrier wall 53 and inbound annular travel barrier wall 54 to provide a complete travel length clutching adjuster.

Referring now to FIGS. 10-15, in at least some embodiments, to prevent adjuster disengagement even if no force resistance is present, the various embodiments of adjusters 20 include travel clutching via the outbound annular travel barrier wall 53 and inbound annular travel barrier wall 54. When the threaded portion 52 of the ball stud 50 is rotated so that the engagement point with the helical thread segment 42 reaches the outbound annular travel barrier wall 53 or the inbound annular travel barrier wall 54 and continues to rotate, the leading one of the helical thread segment(s) 42 or the thread tooth leading edge 48 expands and attempts to jump over the engaged barrier wall (outbound annular travel barrier wall 53 or inbound annular travel barrier wall 54). However, the final one of the helical thread segment(s) 42 or the thread tooth trailing edge 49 does not jump and therefore provides a retaining force that prevents disengagement of the threaded portion 52 of the ball stud 50. The helical thread segments 42 then snap back into the ball stud thread inner portion 59 after one full rotation.

Assembly of the ball stud 50 to the housing 30 is accomplished by assembling all other components together first as is conventional—the input gear 60 is placed into the input gear bore 32, the drive gear 70 is placed into the drive gear bore 33. The ball stud 50 is then inserted through the drive gear 70 and ball stud bore 34 in the housing 30. A push force is then applied to the ball stud 50 to push the lead end 55 through the helical thread segment(s) 42 of the nose 40 of the housing 30. The ball stud 50 can then be rotated to move axially in or out to the desired position for installation into a lamp assembly.

Figure 4:
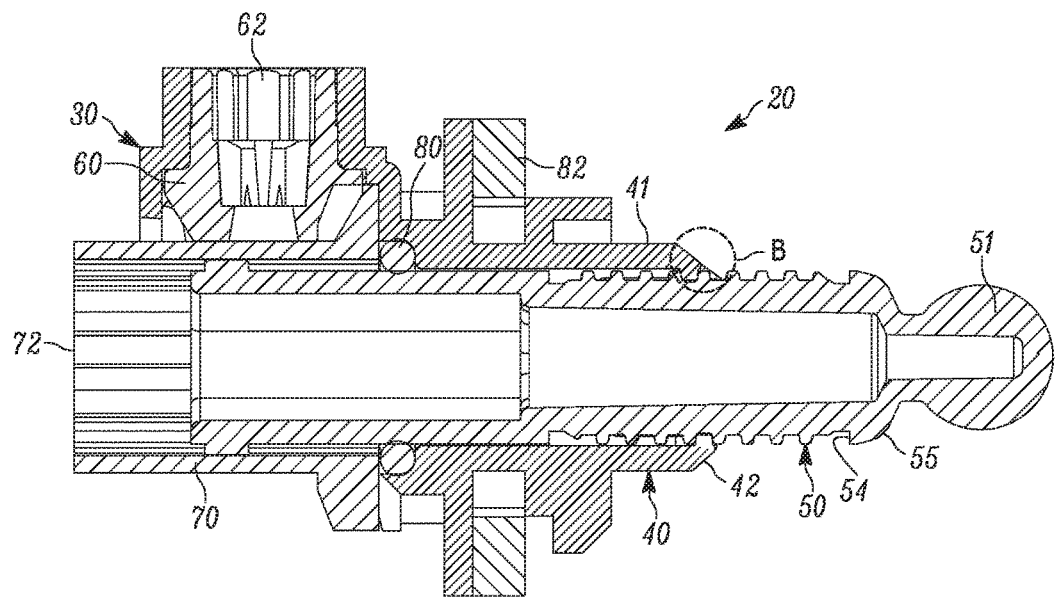
FIG. 4 is a side cross-sectional view of the adjuster of FIG. 1, taken generally along the line A-A in FIG. 3.
Figure 4A:
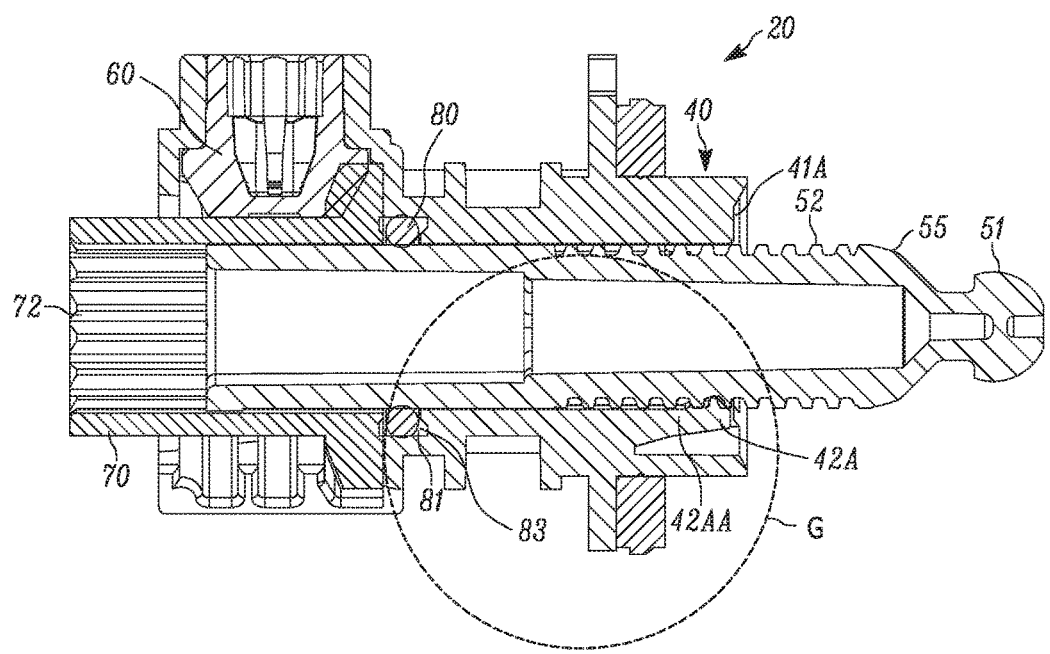
FIG. 4A is a side cross-sectional view of the adjuster of FIG. 1, taken generally along the lines F-F in FIG. 2AA.
Figure 5:
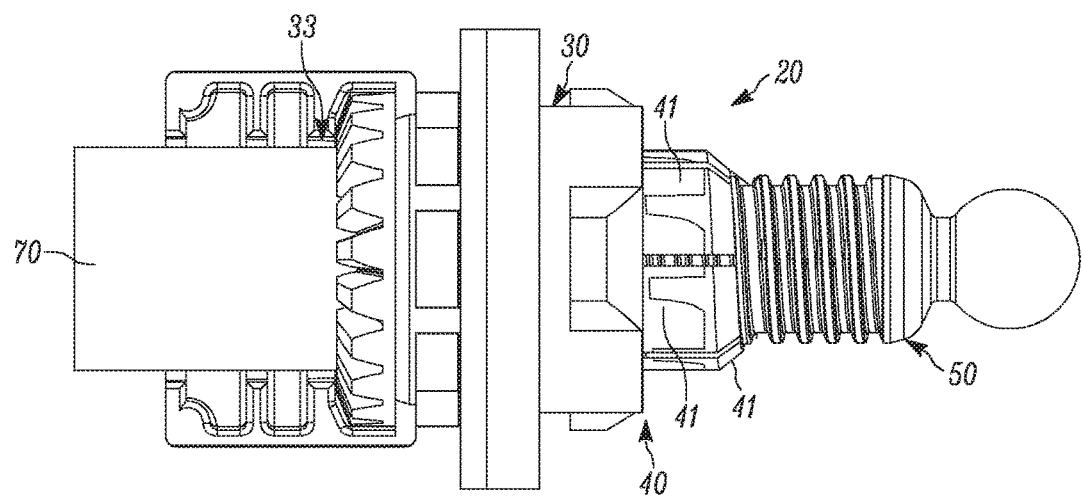
FIG. 5 is a bottom view of the adjuster of FIG. 1.
Figure 5A:
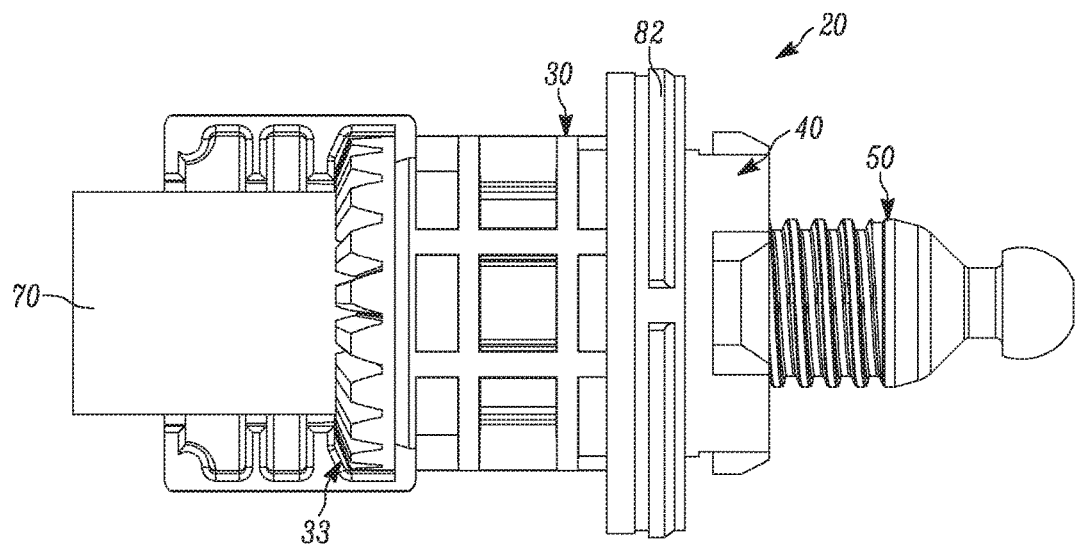
FIG. 5A is a bottom view of the adjuster of FIG. 1A.
Figure 6:
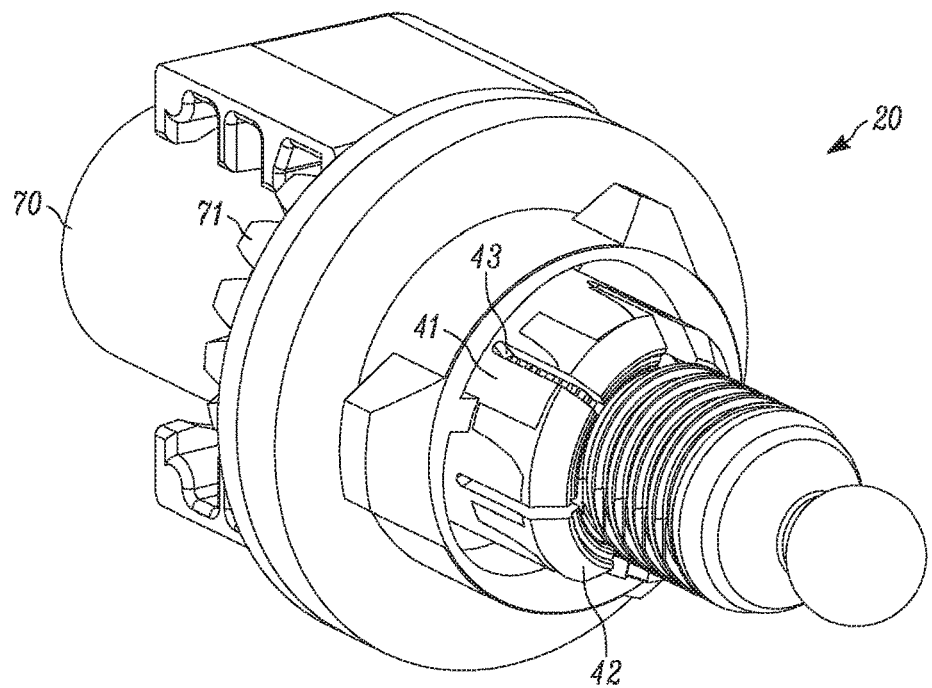
FIG. 6 is a bottom front perspective view of the adjuster of FIG. 1.
Figure 6A:
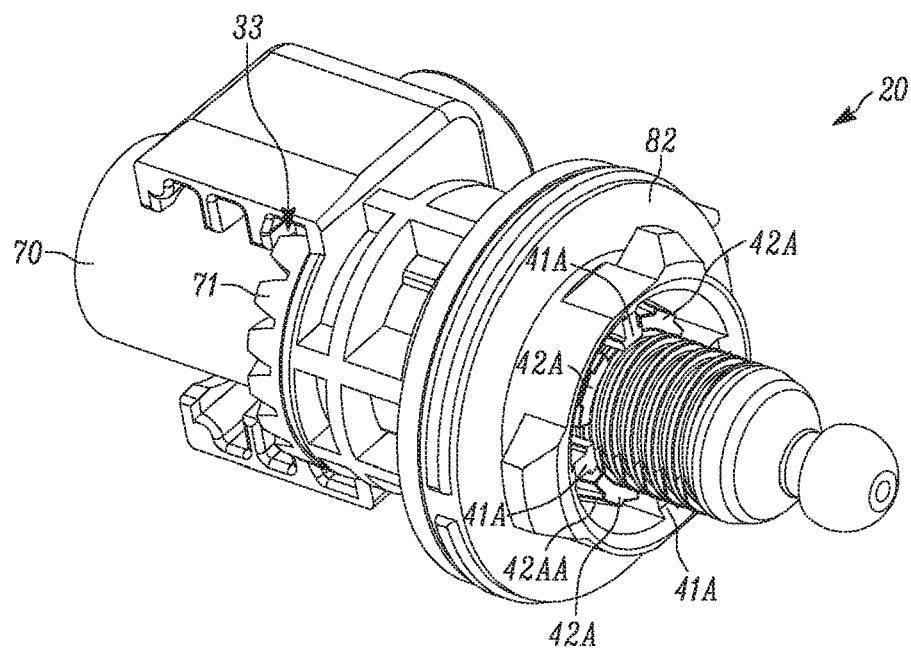
FIG. 6A is a bottom front perspective view of the adjuster of FIG. 1A.
Figure 12A:
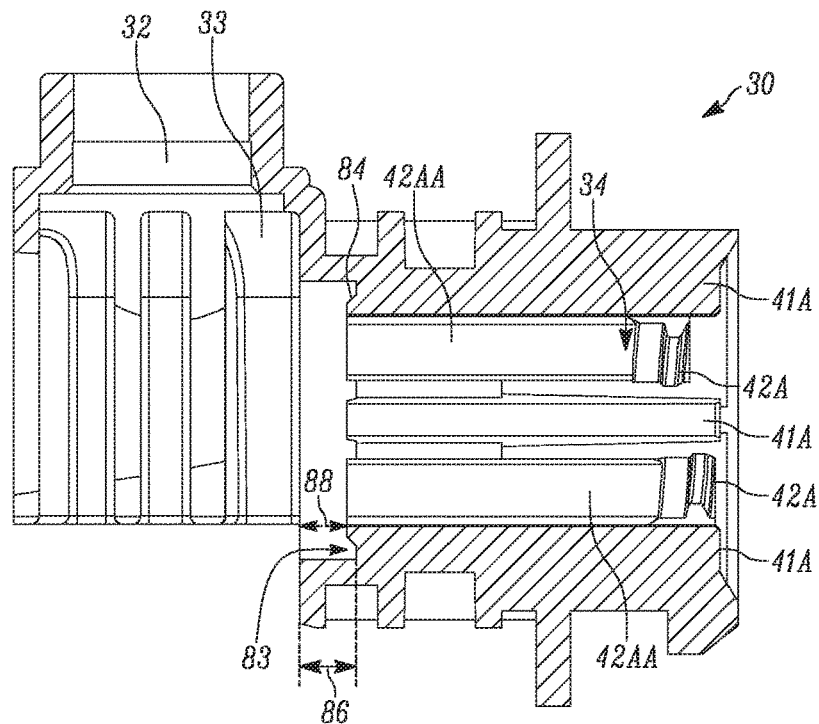
FIG. 12A is a side cross-sectional view of the housing of FIG. 9A, taken generally along the line J-J in FIG. 11A.

As seen in FIGS. 1-6, as is conventional, a ring gasket 82 may be included to seal the housing 30 to the installation location. As seen in FIG. 4, as is also conventional, an internal O-ring 80 can be used to seal the interior of the housing 30 so as to prevent the communication of fluids or gasses through the installed adjuster 20. Other sealing techniques could of course be used. Illustrated with respect to the second and third exemplary embodiments in FIGS. 4A, 8A, 12A, 20, and 22, but also useful in the first illustrated embodiment or other alternative embodiments is an enhanced O-ring gland 81. The enhanced O-ring gland 81 acts to reduce the possibility of the internal O-ring 80 from sticking to or bunching against the unthreaded portion 56 of the ball stud 50 when the ball stud 50 moves axially. A conventional space in the housing 30 to receive the O-ring 80 is illustrated in FIG. 4, which shows a generally square or rectangular shaped space for the O-ring 80. The space is created within the housing 30 and formed with a side of the drive gear 70. In the conventional configuration, as the ball stud 50 moves axially, the O-ring 80 may tend to stick, compress, or bunch between the ball stud 50 and the housing 30 or drive gear 70. This results in uneven adjusting torque (torque spikes). To reduce the risk of O-ring 80 from sticking, compression, and/or bunching, the enhanced O-ring gland 81 can be utilized. The enhanced O-ring gland 81 is also formed from space within the housing and/or drive gear 70 but the space has a different shape. More particularly, the enhanced O-ring gland 81 includes a gland pocket 83, which in at least some embodiments, includes a beveled wall portion 84 that is angled outward to provide a gland outer diameter width 86 that is larger than the gland inner diameter width 88 (see FIG. 12A). As the ball stud 50 is moved axially, the beveled wall portion 84 provides a small bias to urge the O-ring 80 towards the gland pocket 83 and away from the ball stud 50 (while still maintaining a seal) so as to reduce any sticking, compression, and/or bunching. Alternative shapes for an enhanced O-ring gland 81 that achieve the same results could also be designed to provide the necessary urging of the O-ring 80.

Figure 1:
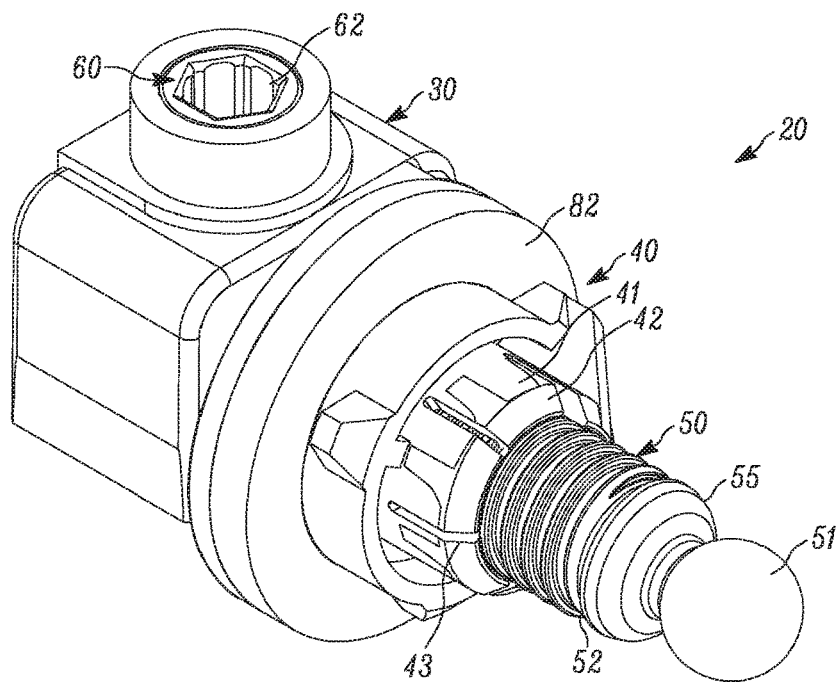
FIG. 1 is a front perspective view of an exemplary embodiment of an adjuster having complete travel length clutching.
Figure 1A:
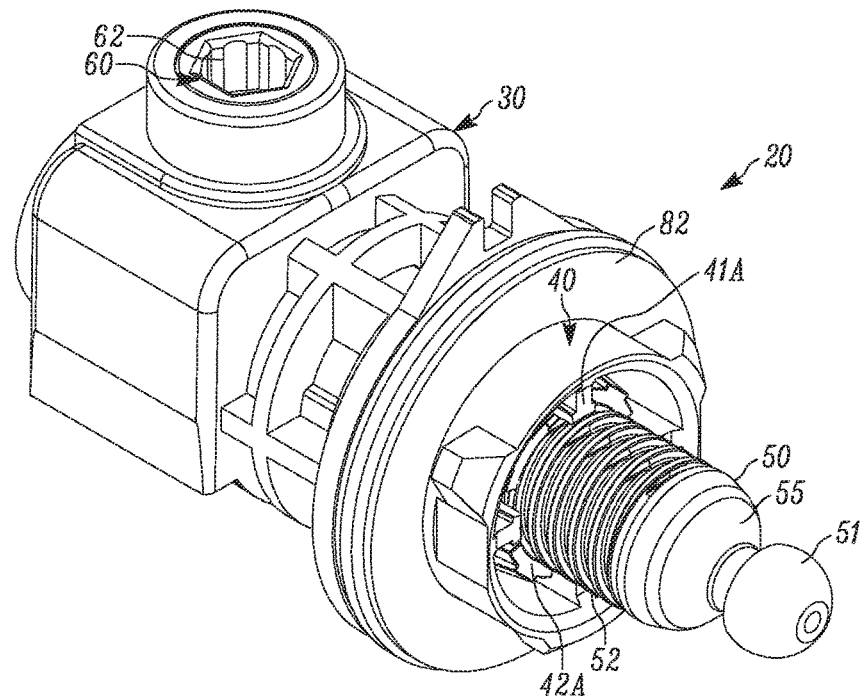
FIG. 1A is a front perspective view of an another exemplary embodiment of an adjuster having complete travel length clutching.
Figure 2:
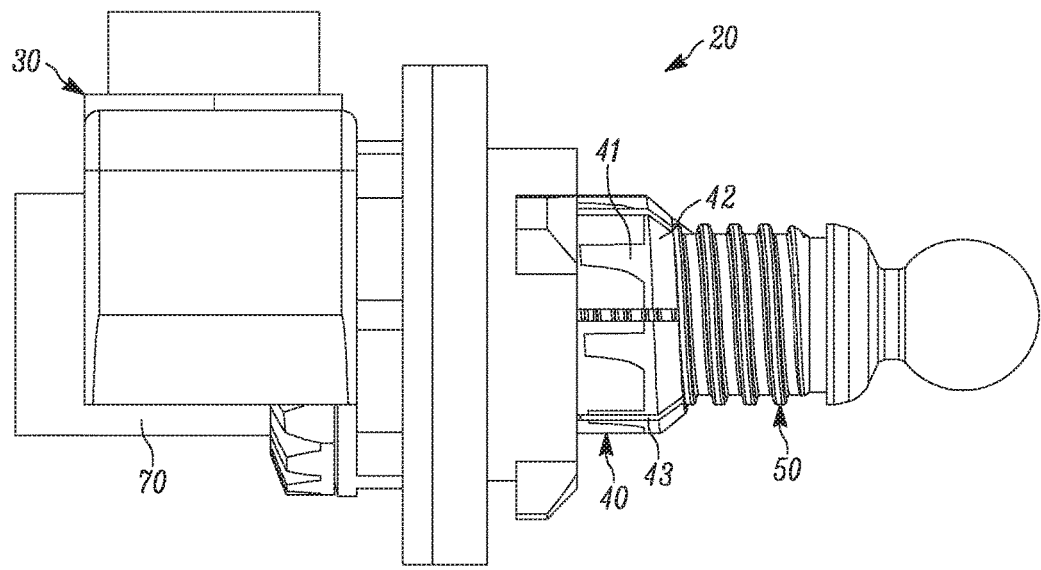
FIG. 2 is a side view of the adjuster of FIG. 1.
Figure 2A:
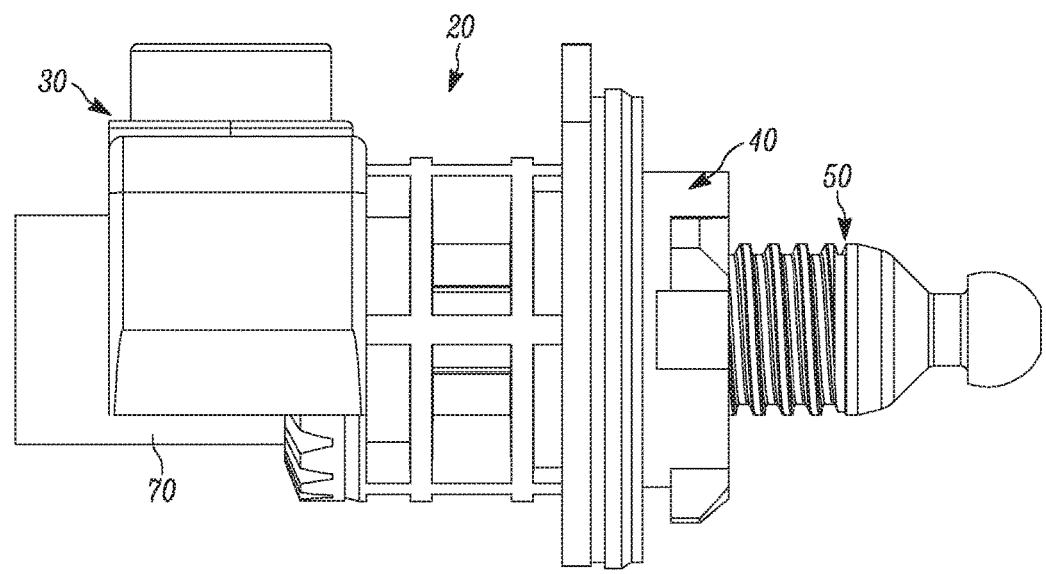
FIG. 2A is a side view of the adjuster of FIG. 1A.
Figure 3:
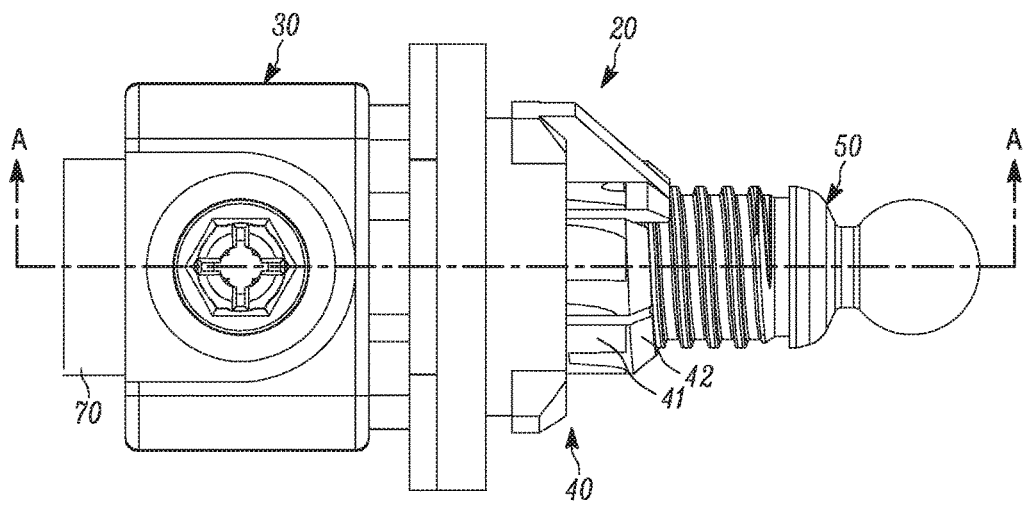
FIG. 3 is a top view of the adjuster of FIG. 1.
Figure 3A:
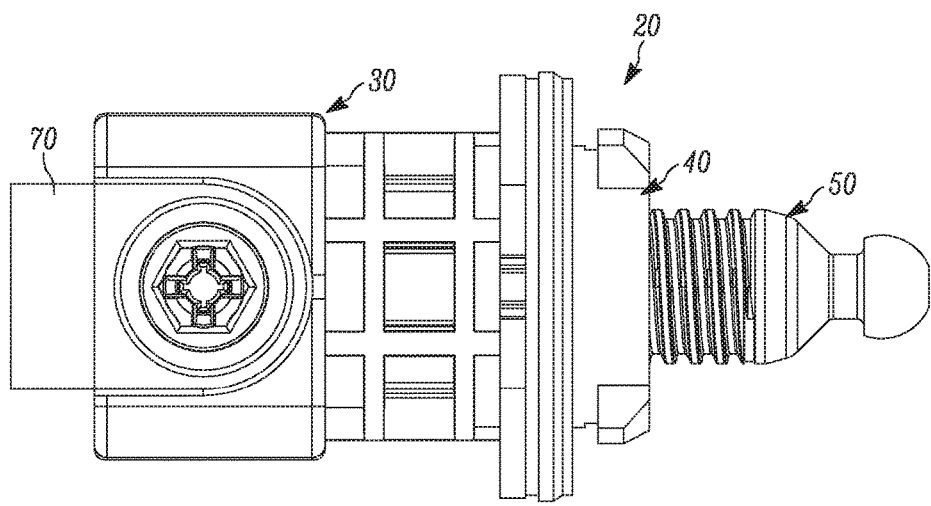
FIG. 3A is a top view of the adjuster of FIG. 1.

Referring to FIGS. 1A-15A, a second exemplary embodiment of the adjuster 20 is illustrated, having a differently configured housing 30 and nose 40. Otherwise, the configuration and function is essentially the same as the previously described embodiment. In this embodiment, additional support is provided within the housing 30 and nose 40 to journal the ball stud 50 such that as much of the threaded portion 52 and unthreaded portion 56 of the ball stud 50 can be supported. This is desirable in circumstances where the ball stud 50 may be subjected to significant lateral loading. This enhanced journaling is best seen in FIGS. 1A, 2AA, 4A, 6A, 8A, 8AA, 9A, 10A, and 12A. In this embodiment, the thread segments include a plurality of helical clutching thread segments 42A and one or more ball stud support segments 41A are used in the nose 40 of the housing 30. Each of the clutching thread segments 42A has a stiffening rib 42AA that can be modified in length and thickness to create an easily controllable clutching point and ease mold tool adjustments. In at least some embodiments, the stiffening ribs 42AA provide a general bias towards the ball stud bore for the clutching thread segments 42A to provide a positive engagement with the threaded portion 52 of the ball stud 50. In at least some embodiments, the clutching thread segments 42A are separated at least in part by the ball stud support segments 41A. The ball stud support segments 41A cooperate to journal the ball stud 50 within the housing 30 along a more substantial portion of its length, thereby providing more resistance to lateral loads applied to the ball stud 50. The clutching thread segments 42A interact with the threaded portion 52 of the ball stud 50 in the same manner as the helical thread segments 42 discussed above, wherein during axial adjustment of the ball stud 50 in the housing 30, tension is created between the clutching thread segments 42A that are engaged with the threaded portion 52 of the ball stud 50. If the ball stud 50 meets a significant force resistance "F", the clutching thread segment(s) 42A will flex outward against the inward bias (biased towards the ball stud bore) of the integrated rib(s) 42AA, to lift out of the ball stud thread inner portion 59 and onto the adjacent ball stud thread outer portion 61, and back into the ball stud thread inner portion 59, this prevents damage to components interconnected with the adjuster, such as portions of the lamp assembly (e.g., reflector, lamp, etc.), or to the adjuster components themselves.

A third exemplary embodiment, seen in FIGS. 16-22, is adjustable only through the ball stud rear end 58 of the ball stud 50. In this embodiment, no input gear 60 or drive gear 70 is provided. Thus, the housing 30 has no input gear bore 32 or drive gear bore 33, and therefore the drive slot 62 is positioned in the ball stud rear end 58 for receiving or otherwise engaging an engagement tool for to provide rotational force to the ball stud 50. In this embodiment a more substantial ball stud bore 34A is provided in the housing 30 for journaling the ball stud 50. A nose 40 is provided in the housing 30 where both the complete travel length clutching and end of travel clutching are provided, as has been described with respect to the previously described embodiments. This embodiment is useful in circumstances where a very compact (i.e., reduced size) adjuster is desired and the ball stud rear end 58 of the ball stud 50 is accessible at the time the adjustment is desired to be made.

Figure 23:
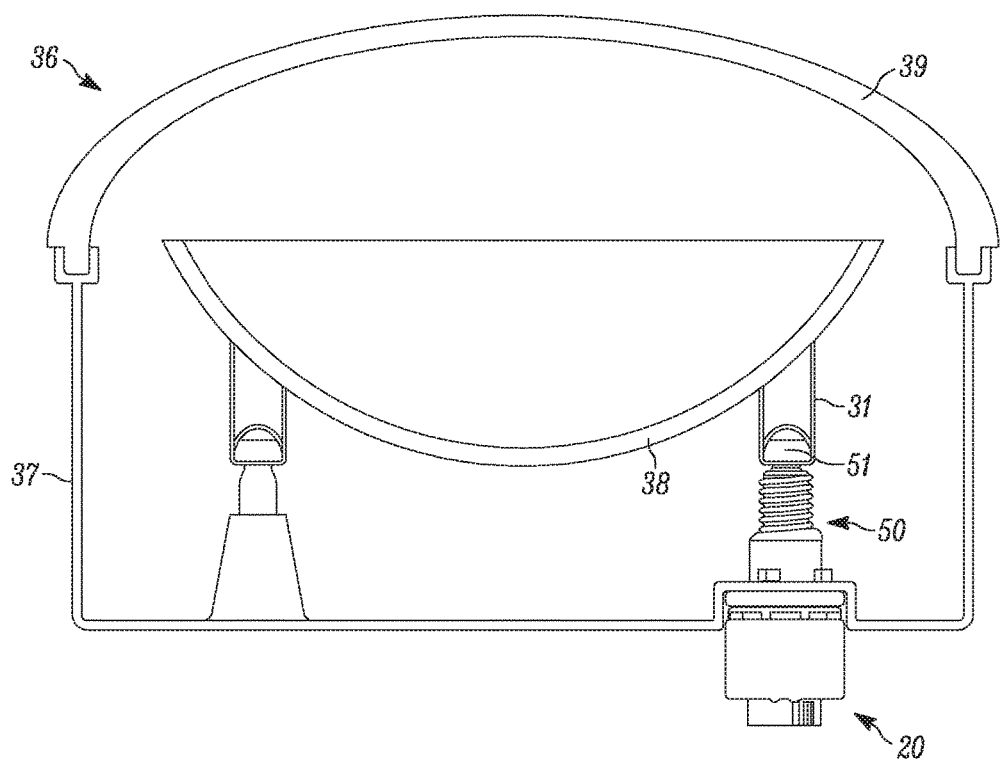
FIG. 23 is a top sectional view of an exemplary lamp assembly that includes the adjuster.

The adjuster 20 disclosed in the aforementioned embodiments, can be utilized in various implementations such as for use with a headlamp. In at least some embodiments, the adjuster 20 is used with the lamp assembly 36. As such, the complete travel length clutching adjuster contemplates the exemplary lamp assembly 36 for use with a vehicle (FIG. 23), including at least one adjuster 20 having an effective length of travel clutching when an undue resistance is present and end of travel clutching regardless of resistance present. Such a headlamp assembly 36 can include a lamp housing 37, a reflector 38 mounted to the lamp housing via a mounting bracket 31 (or mounted directly), a lens 39 covering the lamp housing. If desired, the adjuster may be integrally formed as part of the reflector mounting bracket or as part of the lamp housing 37.

Although the complete travel length clutching adjuster has been herein described in what is perceived to be the most practical and preferred embodiments, it is to be understood that the complete travel length clutching adjuster is not intended to be limited to the specific embodiments set forth above. Rather, it is recognized that modifications may be made by one of skill in the art of the invention without departing from the spirit or intent of the invention and, therefore, the complete travel length clutching adjuster is to be taken as including all reasonable equivalents to the subject matter of the appended claims and the description of the complete travel length clutching adjuster herein.

What is claimed is:

1. A complete travel length clutching adjuster for use with a headlamp, the complete travel length clutching adjuster comprising:
   a housing having a ball stud bore;
   a nose on an end of the housing, the nose including a plurality of discrete helically-shaped thread segments, wherein the thread segments are biased towards the ball stud bore;
   a ball stud journaled by the ball stud bore for axial movement therethrough and passing through the nose of the housing, the ball stud having a threaded portion, an unthreaded portion, a ball extending from a first end thereof, and a drive spline portion proximate a second end thereof;
   an outbound annular travel barrier positioned on the ball stud between the threaded portion and the unthreaded portion of the ball stud, and an inbound annular travel barrier positioned on the ball stud between the threaded portion and the first end;
   wherein, in adjusting operation, rotation of the ball stud via the drive spline causes axial movement of the ball stud through the ball stud bore via threaded engagement of the threaded portion of the ball stud and thread segments of the nose;
   wherein, in length of travel clutching operation where the ball stud is axially rotated through the ball stud bore and neither the outbound annular travel barrier or the inbound annular travel barrier is in abutment with the thread segments of the nose, the receipt of an undue axial force of resistance on the ball stud results in outward deflection of engaged thread segments, thereby allowing the threaded engagement between the threaded portion of the ball stud and the thread segments of the nose to clutch; and
   wherein, in end of travel clutching operation where the ball stud is axially rotated and either the outbound annular travel barrier or inbound annular travel barrier is in abutment with the thread segments, a resultant outward deflection of the engaged thread segments of the nose is provided, thereby allowing the threaded engagement between the threaded portion of the ball stud and the thread segments of the nose to clutch.

2. The clutching adjuster of claim 1, further including a plurality of ball stud support segments extending longitudinally in the ball stud bore, wherein at least one of the ball stud support segments is situated circumferentially between at least two of the thread segments.

3. The clutching adjuster of claim 2, wherein the thread segments of the nose are integrated with a stiffening rib.

4. The clutching adjuster of claim 1, wherein the thread segments of the nose include a thread tooth having a thread tooth leading edge and a thread tooth trailing edge, and wherein the thread tooth leading edge is engageable with the inbound annular travel barrier and the thread tooth trailing edge is engageable with the outbound annular travel barrier.

5. The clutching adjuster of claim 4, wherein the housing further includes a drive gear bore and an input gear bore.

6. The clutching adjuster of claim 5, further including a drive gear journaled in the drive gear bore, wherein the drive gear includes drive gear splines in mating engagement with the drive splines of the ball stud, and wherein rotation of the drive gear provides axial rotation of the ball stud.

7. The clutching adjuster of claim 6, further including an input gear journaled in the input gear bore, wherein the input gear is matingly engaged with the drive gear to impart rotational movement to the drive gear, and wherein the input gear includes a drive slot for receiving a rotational force via an engagement tool.

8. The clutching adjuster of claim 7, further including a plurality of ball stud support segments extending longitudinally in the ball stud bore, wherein at least one ball stud support segment is situated circumferentially between each of the thread segments.

9. The clutching adjuster of claim 1, wherein the housing is formed integrally with another piece of the headlamp.

10. The clutching adjuster of claim 4, wherein the second end includes a drive slot for receiving an engagement tool, and wherein the housing is not configured to receive an input gear or a drive gear for engagement with the ball stud.

11. The clutching adjuster of claim 1, further including an O-ring gland for receiving an O-ring, wherein the O-ring gland includes a gland pocket, and wherein the gland pocket includes a beveled wall portion that is angled outward to provide a gland outer diameter width that is larger than a gland inner diameter width.

12. The clutching adjuster of claim 4, wherein the thread tooth of each thread segment engages the ball stud thread inner portion to axially displace the ball stud through the ball stud bore during rotation of the ball stud, and wherein clutching of the thread segments of the nose includes displacement of one or more thread teeth out of the ball stud thread inner portion and onto the ball stud thread outer portion.

13. The clutching adjuster of claim 1, wherein the housing is at least one of secured to and integrally formed with a headlight housing of a headlight assembly, and wherein the ball is shaped to pivotally engage at least one of a mounting bracket and a reflector of the headlight assembly, and wherein rotation of the ball stud displaces the reflector relative to the headlight housing.

14. The clutching adjuster of claim 1, further including an O-ring gland for receiving an O-ring, wherein the O-ring gland includes a gland pocket.

15. The clutching adjuster of claim 14, wherein the gland pocket includes a beveled wall portion that is angled outward to gland outer diameter width that is larger than a gland inner diameter width.

16. The clutching adjuster of claim 2, wherein the housing further includes a drive gear bore having a drive gear journaled therein, an input gear bore having an input gear journaled therein, wherein the drive gear includes drive gear splines in mating engagement with the drive splines of the ball stud, and the input gear is matingly engaged with the drive gear to impart rotational movement to the drive gear, and wherein the input gear includes a drive slot for receiving a rotational force via an engagement tool.

17. The clutching adjuster of claim 16, further including four ball stud support segments extending longitudinally in the ball stud bore, wherein each ball stud support segment is alternately situated circumferentially between four thread segments, and wherein the ball stud is supported at least in part by the ball stud support segments.

18. The clutching adjuster of claim 1, further including a plurality of ball stud support segments extending longitudinally in the ball stud bore, wherein the ball stud support segments extend radially to longitudinally engage the ball stud both during traversal of the ball stud through the ball stud bore and during non-movement of the ball stud.

19. The clutching adjuster of claim 1, wherein the outbound annular travel barrier and inbound annular travel barrier each comprise a wall extending perpendicular to the unthreaded portion of the ball stud.

\* \* \* \* \*